PROCESS MODEL

United States Patent Office 3,606,284
Patented Sept. 20, 1971

3,606,284
METHOD AND APPARATUS FOR CEMENT KILN CONTROL
Myron Robert Hurlbut, Peabody, Mass., and James William Lane, Houston, Tex., assignors to General Electric Company
Filed Sept. 26, 1969, Ser. No. 861,423
Int. Cl. F27b 7/00
U.S. Cl. 263—32          13 Claims

ABSTRACT OF THE DISCLOSURE

A method and apparatus for improving the control of a rotary cement kiln wherein the fuel rate set point and the exit gas rate set point are normally controlled. During a normal range of kiln disturbances, the control of fuel rate set point is based upon kiln drive motor torque measurements in conjunction with feedback signals generated by a dynamic kiln model which stores a record of past control actions. Control of the exit gas rate set point is based upon measurements of gas temperature at a selected intermediate area of the kiln. Oxygen content of the exit gas is monitored and employed to exercise overriding control to insure that no combustibles which might cause an explosion appear in the exit gas. Abnormal disturbances alter the kiln speed to thereby effect a more rapid process response to the abnormal disturbance.

BACKGROUND OF THE INVENTION

This invention relates to the production of cement in rotary kilns and, in particular, to an improved method and apparatus for controlling and regulating the operation of rotary cement kilns to provide stable kiln operation with resulting uniformity of product quality and improved fuel efficiency.

Typical rotary kilns employed in the production of portland cement are steel cylinders eight to twenty-five feet in diameter and between one-hundred and seven-hundred feet long. The cylinders are lined with refractory brick and inclined two to three degrees from the feed end to the discharge end. The steel cylinder is supported at spaced points and rotated through a gear drive by an electrical motor at speeds in the order of 20 to 120 revolutions per hour. Cement raw material, such as finely ground limestone, clay or shale intermixed in the desired proportions and either in the form of a finely ground slurry or a dry pulverized, intermixed material are fed into the upper or feed end of the rotary kiln.

During rotation of the kiln, the raw materials move slowly down the kiln at a rate which is a function of the kiln rotational speed and pass through successive zones known as the drying or chain zone, the pre-heating zone, the calcining zone and the clinkering or burning zone. If the raw materials enter the feed end of the kiln in the form of a wet slurry, the moisture is evaporated in the chain zone which may extend for 25% of the kiln length. Chains are suspended from the kiln to contact the slurry and serve as a heat exchanger to drive off moisture. The drying or chain zone is not necessary in a kiln which is specifically adapted to use only a dry mix. As the materials move down the kiln, they are slowly heated by a stream of hot gases which are produced by a burner positioned at the lower or discharge end of the kiln and which flow counter to the direction of material movement in the kiln. A fan at the feed end of the kiln creates a slightly negative pressure in the kiln and draws the hot combustion gases produced by the burner through the kiln to heat the raw materials moving in the opposite direction, causing the raw materials to undergo successive changes due to the steadily increasing temperature of the material.

The temperature of the dried raw materials increases until the calcining temperature is reached at which time carbon dioxide is liberated from the raw materials, changing the carbonates to oxides. The calcining zone occupies the major portion of the kiln length. The temperature of the material changes little within the calcining zone since the calcining reaction is endothermic and requires heat. A measurement of the material temperature within this zone gives little indication of the degree of calcination. At a point down the kiln where calcination is complete, a large temperature difference exists between the solid materials and the counter-flowing hot gases. Thus, when calcination is complete, the temperature of the solid material begins to increase rapidly to the point where the exothermic clinkering reactions are initiated. The heat generated by these chemical reactions causes the solid material temperature to rapidly increase 700–800° F. The clinkering or burning zone is near the discharge end of the kiln and the material remains at or near the high temperature until it leaves the kiln and is thereafter cooled. The degree of completion of the chemical reaction in the clinkering or burning zone depends upon the feed composition, the temperature in this zone and the residence time of an increment of feed within the zone.

The kiln must be controlled in such a manner as to produce a clinker product having a satisfactory quality and preferably a uniform quality. The variables over which a kiln operator has immediate control and which directly influence the kiln operation are the kiln feed rate, i.e. the rate at which the raw materials are fed into the upper end of the kiln, the kiln rotational speed, the fuel rate, i.e. the rate at which fuel is injected into the kiln and burned, and the exit gas rate, i.e. the rate at which the combustion gases and other gaseous kiln products are drawn through the kiln and exhausted from the feed end into the atmosphere. The kiln operator attempts to select values for each of these control variables which will result in stable kiln operation producing a desirable product at the required product volume.

In early rotary cement kilns, the operator visually observed the color of the burning zone, the position of the boundary between the calcining and burning zones and the clinker size and consistency and took corrective action based upon these observations, using judgment gained by past experiences. In general, kiln performance based on this type of control was poor in terms of product quality, product uniformity and fuel efficiency. More recently, elaborate instrumentation has been employed to sense various parameters during kiln operation. This provided the operator with more information of higher accuracy for determining proper control action. However, the results obtained are still a function of the operator's interpretation of the measurements and his judgment.

Still more recently, several automatic control arrangements for rotary cement kilns have been proposed. One such system which is effective to control rotary cement kiln operation is described in U.S. Pat. No. 3,469,828 (Ser. No. 678,851) issued (filed Oct. 30, 1967) to James W. Lane and assigned to the same assignee as the present invention. However, most, if not all, such control arrangements operate within a limited range and are able to maintain control of kiln operation only if the kiln operating point remains within this limited range.

The range over which any controller is effective is a direct function of how well the relation between the manipulated variable and the controlled variable has been defined. If the relation is known exactly and never changes, then a controller can be defined which will perform satisfactorily for all deviations of the controlled variable from the setpoint value. However, in most processes, the relation between the manipulated and controlled variables can only be approximated and a control relationship, for example, in the form of an equation, is derived which fits this relationship over a reasonable range. Consequently, the more complicated the relation between the manipulated and controlled variables, the more sophisticated the equation required to provide a controller which will function over a reasonable range. The range of effective control of a controller may be defined by specifying the maximum allowable deviation of the controlled variable from a normal or setpoint value.

If the controlled value deviates outside the effective range of the controller, the controller may be incapable of exercising control over the process and external intervention is normally required to maintain control. In a cement kiln control system, control of the kiln may be lost if buning zone conditions deviate outside the effective control range. For example, if the length of the burning zone becomes too short due to a disturbance in kiln operation, the amount of dense clinker material in the burning zone may not be sufficient to resist the force of the feed dammed up behind the burning zone. Consequently, the feed may push forward to the discharge end of the kiln without completion of the clinkering reaction resulting in a poor quality product. The corrective action initiated by the control system may not be sufficient to prevent this occurrence. Accordingly, it is desirable to detect and to anticipate deviations of the controlled variable outside the effective range of the controller and to correct the disturbance before control is lost.

It is therefore, an object of this invention to provide an improved method and apparatus for controlling the operation of a rotary cement kiln.

It is another object of this invention to provide a control method and apparatus for maintaining control of a rotary cement kiln when deviations outside the normal effective range of control are experienced.

It is a further object of this invention to provide a method and apparatus for maintaining control of burning zone conditions in a rotary cement kiln when the burning zone conditions deviate outside the normal effective control range.

SUMMARY

The foregoing objects are achieved, in accordance with the illustrated embodiment of the invention, by providing torque control apparatus including a sensor for measuring the torque developed by the kiln drive motor to rotate the kiln and a filter for smoothing and filtering the sensor output. The filtered signal is checked to insure that it falls within a predetermined range and is then compared to a setpoint signal. The error signal representing the difference between the filtered signal and the setpoint signal is applied to a summing amplifier which also receives the output of a process model. The output of the summing amplifier is applied to the process model and to a torque controller which receives a signal indicating the base rate of fuel flow to the kiln. In response to a variation in the output of the summing amplifier the torque controller calculates a new fuel rate setpoint which tends to correct the burning zone conditions and return the drive motor torque to the setpoint value.

Forcing apparatus responsive to the error signals is provided to correct kiln conditions and to maintain control of the kiln if the kiln operating point, as indicated by drive motor torque, deviates outside the effective control range of the torque control apparatus or if such deviation is anticipated. The forcing apparatus utilizes selected error signals to determine the rate of change of drive motor torque and calculates a forcing function value which is a function of the magnitude of the error signal and the rate of change of drive motor torque. The forcing apparatus includes check and control logic which monitors the forcing function value and generates a speed control signal to cause a reduction in rotational speed of the kiln when the forcing function value exceeds a predetermined reference value. The forcing apparatus maintains the reduced kiln rotational speed until the kiln operating point returns to within the effective control range of the torque control apparatus.

The subject matter of the invention is particularly pointed out and distinctly claimed in the concluding portion of the specification. The above and further objects and advantages of this invention may be better understood by reference to the following description taken in connection with the accompanying drawings.

DESCRIPTION OF AN ILLUSTRATIVE EMBODIMENT

Figure 1:
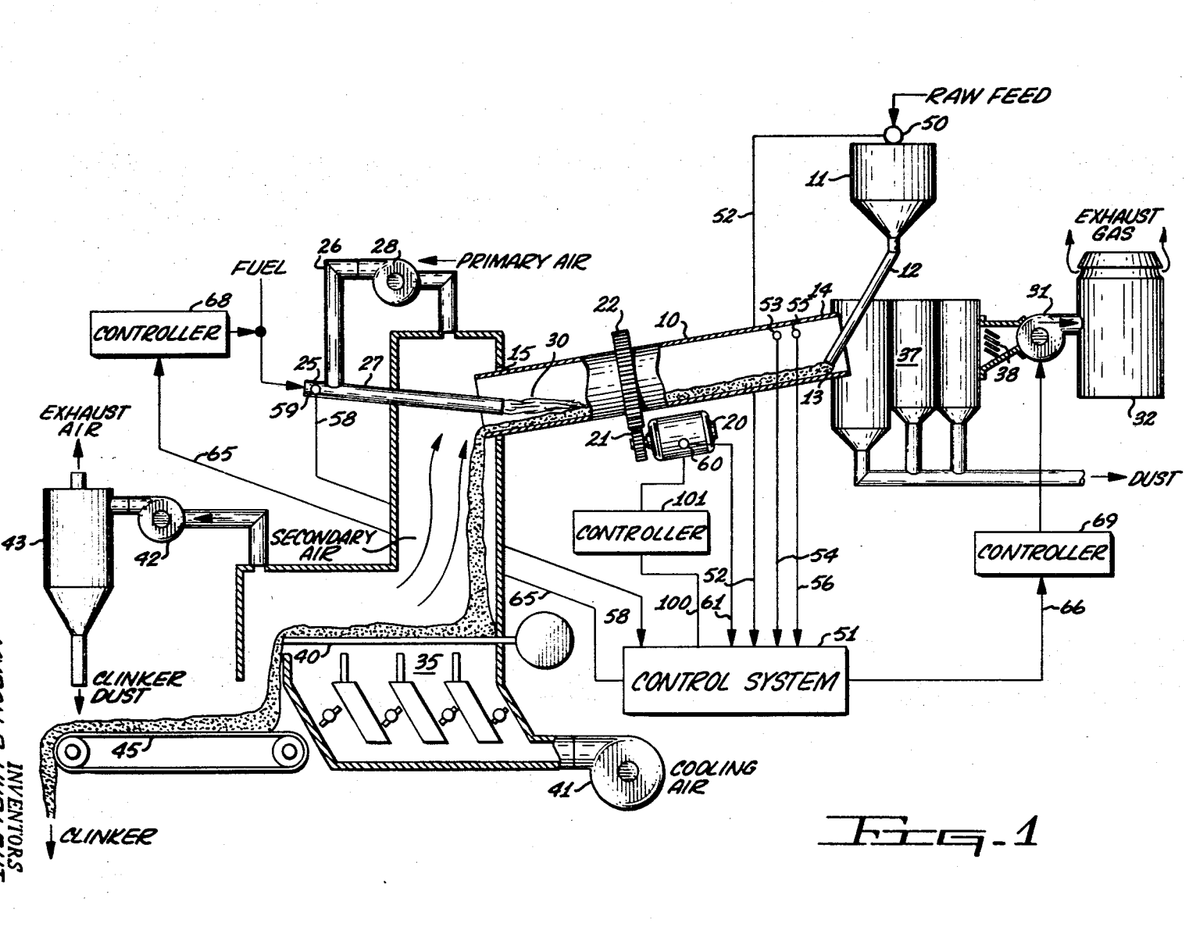
FIG. 1 is a schematic diagram depicting a rotary cement kiln embodying and utilizing the present invention.

Referring to FIG. 1, a typical rotary cement kiln with its associated equipment is schematically illustrated. Rotary cement kiln 10 has at its upper or feed end a kiln feed hopper 11 and a kiln feed pipe 12 for feeding blended raw materials 13 into the upper end of kiln 10. The raw materials normally include $Al_2O_3$, $SiO_2$, $Fe_2O_3$, $MgCO_3$ and $CaCO_3$ plus small amounts of $K_2O$, $Na_2O$ and sulphur. The blended raw materials or feed may be in the form of a dry powder or a slurry and may be preheated in a heat exchanger utilizing the kiln exit gases. The specific embodiment shown is particularly adapted for use with a dry mixture. Chains would be suspended along the kiln adjacent the feed end 14, to remove moisture if a slurry were used or could be suspended to preheat a dry mixture. Kiln 10, inclined downward at an angle of approximately 3 degrees from feed end 14 to discharge end 15, is rotated by an electric motor 20 shown here driving a pinion gear 21 that engages a ring gear 22 encircling and attached to kiln 10. As kiln 10 is rotated by kiln drive motor 20 through gears 21 and 22, the kiln rotation causes the raw materials or feed to slowly cascade forward, the rate of forward progress of the feed within kiln 10 being approximately proportional to kiln rotational speed. Motor 20 is normally controlled to drive kiln 10 at a predetermined constant rotational speed.

At the discharge end of the kiln, a fuel supply line 25 and a primary air supply line 26 are connected to a fuel-air mixing chamber 27 which injects a high-energy flame 30 into kiln 10. Natural gas, pulverized coal, oil or combinations thereof may be employed as fuel, the fuel being fed into line 25 from a suitable source. The primary air is forced through line 26 and into chamber 27 by fan 28.

The interior of kiln 10 is lined with a refractory material (not shown) which is capable of absorbing heat from flame 30 and transmitting it to the gases and feed travelling through kiln 10. The combustion gases and other gaseous kiln products are drawn through the kiln by an induced draft fan 31 which exhausts the gases through a dust collector and stack 32. Induced draft fan 31 creates a slightly negative pressure in the kiln drawing secondary air from clinker cooler 35 through the kiln.

The gases emerging from feed end 14 of kiln 10 pass through a series of dust collectors 37 which recover the dust and an exit gas damper 38.

As the feed proceeds slowly down the kiln, it is heated by hot gases flowing counter to it and also by the heated refractory walls of the kiln. The temperature of dry feed increases until the calcining temperature is reached. At this point, the calcium carbonate $CaCO_3$ and the magnesium carbonate $MgCO_3$ begin to decompose, forming CaO and MgO. The released carbon dioxide $CO_2$ joins the combustion gas and is drawn from kiln 10 by fan 31. The zone of kiln 10 where this reaction occurs is called the calcining zone. This reaction continues over a major portion of the kiln length. The temperature of the feed changes very little within this zone since the calcining reaction is endothermic and requires heat. A measurement of feed temperature within this zone will not give a meaningful indication of the degree of calcination of the feed.

At the point in kiln 10 where calcination of the feed is complete, a large temperature difference exists between the feed and the combustion gases and therefore a rapid increase in feed temperature results. The temperature at which the exothermic clinkering reaction occurs is reached quickly and the heat generated by the clinkering reaction causes the temperature of the feed to increase still further to the point where the solids become partially liquefied. The clinkering reaction for the formation of $(CaCO)_2 \cdot (SiO_2)$, $(CaCO)_3 \cdot (Al_2O_3)$ and $$(CaO)_4 \cdot (Al_2O_3) \cdot (Fe_2O_3)$$

which are the crystalline compounds that determine the physical properties of the cement, occurs rapidly. The resulting partly fused mass of varying size continues to move down the burning zone of the kiln and remains near its maximum temperature until it nears discharge end 15 of the kiln. While at this temperature, most of the remaining CaO combines with the $(CaO)_2 \cdot (SiO_2)$ to form $(CaO)_3 \cdot (SiO_2)$. The degree of completion of this clinkering reaction depends upon the feed composition, the temperature in the burning zone and the residence time of an increment of feed within the zone.

As the hot clinker material approaches the end of the kiln, it begins to lose some of its heat to the incoming secondary air. At the exit end of the kiln, the clinker drops onto the travelling grate 40 usually reciprocated by a motor 40a. Air is blown through grate 40 by fan 41 to cool the clinker. Part of the resulting heated air becomes secondary air which is drawn through kiln 10 by fan 31, the remainder being exhausted by fan 42 through dust cyclone 43 to the atmosphere. The cooled clinker is transported by conveyor 45 to grinding apparatus (not shown) which pulverizes the clinker to form cement.

A number of sensors are provided to monitor various parameters of kiln operation and to generate electrical signals representing the values of these parameters. These signals are employed by the control system of the invention to direct the operation of the kiln. As illustrated in FIG. 1, hopper 11 has a feed rate detector 50 associated therewith which provides a signal to control system 51 over line 52 indicating the rate at which feed is being supplied to the kiln. A temperature measuring device 53, for example a thermocouple, is provided near feed end 14 of the kiln to provide a signal transmitted to control system 51 on line 54 indicating the temperature of the gases flowing through the kiln at that point. Temperature measuring device 53 is located adjacent the chain section or a heat exchanger so it accurately measures the temperature of the gases passing over the feed. Alternatively, the temperature at the feed end 14 can be utilized with proper compensation for the heat exchanger or chain section. Analyzer 55 is also provided near the feed end 14 of the kiln to measure the oxygen content of the gases being exhausted from the kiln, the signal representative of the oxygen content being applied to control system 51 on line 56.

A signal representing the rate of fuel flow to mixing chamber 27 is provided to control system 51 on line 58 by sensor 59 associated with fuel supply line 25. Sensor 60 associated with kiln drive motor 20 provides a signal to control system 51 on line 61 representing the torque developed by motor 20 as required to rotate kiln 10 at the predetermined rotational speed. Control system 51 utilizes the information concerning kiln operation provided on lines 52, 54, 56, 58 and 61 to produce kiln control signals on lines 65, 66 and 100. The control signal on line 65 represents a fuel rate setpoint and is applied to controller 68 to control the rate of flow of fuel into mixing chamber 27 and therefore the heat input to kiln 10. The control signal on line 66 represents an exit gas rate setpoint and is applied to controller 69 to control the speed of induced draft fan 31 and therefore the exit gas flow rate. The signal on line 66 representing an exit gas rate setpoint may, alternatively, be employed to control the position of damper 38, thereby adjusting the exit gas flow rate. The control signal on line 100 represents a kiln speed setpoint and is applied to controller 101 to control the rotational speed of kiln drive motor 20 and therefore the rotational speed of kiln 10. Controllers 68, 69 and 101 are standard analog controllers as known in the art and will not be described in detail.

Figure 2:
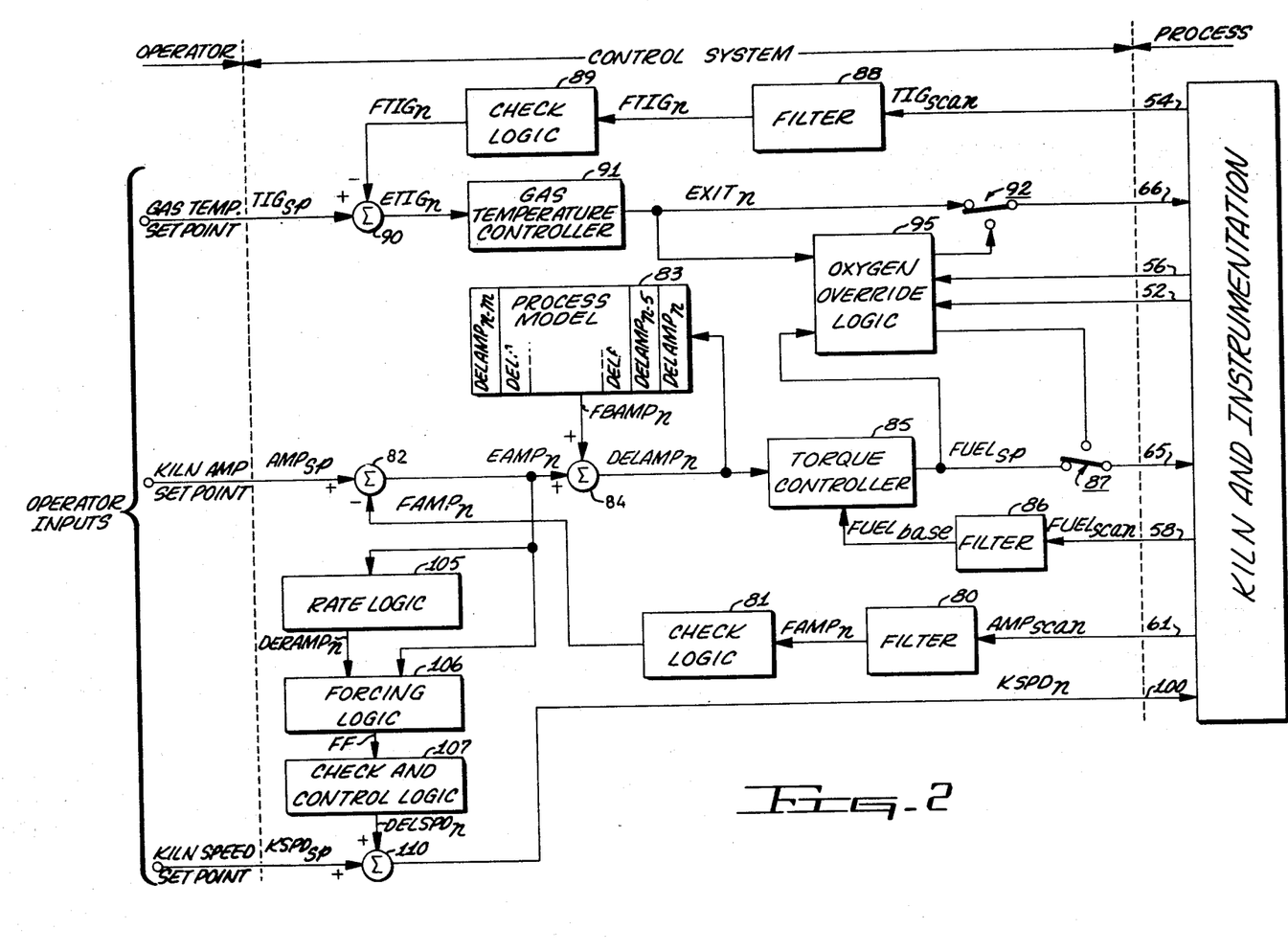
FIG. 2 is a block diagram illustrating a control system incorporating the invention and employed to control the operation of the rotary cement kiln of FIG. 1.

FIG. 2 illustrates the details of control system 51 shown in FIG. 1. Referring to FIG. 2, the signal on line 61 representing the torque developed by kiln drive motor 20 to rotate kiln 10 is applied to filter 80. If kiln drive motor 20 is an AC motor, assuming a constant speed of rotation of kiln 10, the signal on line 61 is a measure of the kilowatt power input to motor 20 which represents the torque developed by motor 20 to rotate kiln 10. If kiln drive motor 20 is a constant field, DC motor, the signal on line 61 is a measure of the armature current of kiln drive motor 20 which represents the torque developed by motor 20 to rotate kiln 10, with constant field and supply voltages. For purposes of this description, motor 20 is assumed to be a constant field, DC motor; and the signal on line 61 representing the armature current in and the torque developed by motor 20 is termed $AMP_{scan}$. Various means for obtaining a torque signal from other motors are known in the art. Sensor 60 therefore comprises an instrument capable of measuring and providing an output signal proportional to the armature current or torque of motor 20.

Experience has shown that when a signal directly proportional to the torque required to turn the kiln is filtered and smoothed, it is a very reliable and sensitive indicator of the heat state within the kiln, in particular the condition of the burning zone, and of the relative amount of dense clinker material in the burning zone. The material in the burning zone undergoing the clinkering reaction is much denser than the remainder of the feed in the kiln. In addition, since normally 10 to 30 percent of the material in the burning zone is in a liquid state, the flow characteristics of this material differ drastically from the remainder of material in the kiln. The liquefied material in the burning zone is much stickier and tends to form a mass which adheres to the refractory surface. The material thus rides much higher on the kiln wall as the kiln rotates and requires more torque to carry the material along the kiln.

As the kiln temperature increases, the burning zone lengthens and the amount of this dense liquefied material increases, requiring an increase in the rotational torque supplied by kiln drive motor 20. As the kiln temperature decreases, the burning zone shortens and the amount of this dense liquefied material decreases, decreasing the torque developed by drive motor 20. Thus, changes in the torque developed by drive motor 20 in rotating the kiln indicate changing heat conditions within the kiln which are causing the burning zone to lengthen or shorten. Slow changes in torque over a period of time indicate very small imbalances in heat input, normally undetected by an operator, which, if corrected immediately, will prevent larger upsets and more drastic corrective action at a later time. The signal $AMP_{scan}$ therefore represents the instantaneous heat state within the kiln and changes in the value of $AMP_{scan}$ indicate corresponding changes in the condition of the burning zone. The use of torque measurements represented by the signal $AMP_{scan}$ to effect control of kiln operation independent of actual burning zone temperature measurements are claimed in U.S. Pat. No. 3,469,828 (Ser. No. 678,851) issued (filed Oct. 30, 1967) and granted to James W. Lane and assigned to the same assignee as the present invention. Filtering and smoothing of the $AMP_{scan}$ signal to remove noise and other signal variations unrelated to the condition of the burning zone, for example the effect of kiln rotation on the signal, is performed in filter 80. The output signal of filter 80 is $FAMP_n$. The filtering action of filter 80 is described in the equation:

$$FAMP_n = FAMP_{n-1} + K_{amp}(AMP_{scan} - FAMP_{n-1})$$

where $FAMP_n$ is the new filtered value,
$FAMP_{n-1}$ is the last filtered value,
$AMP_{scan}$ is the present scan value, and
$K_{amp}$ is the filter constant.

The function of filter 80 may conveniently be performed in a digital computer with $K_{amp}$, $FAMP_n$ and $FAMP_{n-1}$ being stored in the computer memory. This calculation is performed at short intervals, for example every 5 seconds, to insure that signal $FAMP_n$ represents the current condition of the burning zone, forming an accurate basis for control action. $K_{amp}$ is selected to be small enough to eliminate noise and the effect of kiln rotation on the signal but not so small as to damp out the signal and may be, for example .005.

Output signal $FAMP_n$ of filter 80 is applied to check logic 81. Check logic 81 compares the present output signal $FAMP_n$ of filter 80 with the previous output signal $FAMP_{n-1}$. If the present and previous filtered values differ by more than a given amount, it is assumed that some unusual conditions exist within the kiln and output signal $FAMP_n$ of filter 80 is not used until it returns to within a reasonable range of $FAMP_{n-1}$. Check logic 81 serves to mask momentary or short term disturbances. The function performed by check logic 81 may be conveniently implemented in a digital computer; it may be implemented either on $FAMP_n$ or on $AMP_{scan}$.

Output signal $FAMP_n$ of filter 80, if within the required range, is applied to summing amplifier 82. A kiln amp setpoint signal $AMP_{sp}$ is also applied to summing amplifier 82. The kiln amp setpoint represented by signal $AMP_{sp}$ is controlled by the operator by means of a potentiometer or a value stored in a digital computer and will normally be based upon the chemical analysis of the kiln product periodically reported to the operator. For example, if the free line (uncombined CaO) content of the kiln product is too low, the operator will lower the kiln amp setpoint, whereas if the free lime content is too high, the operator will raise the kiln amp setpoint. Typical kiln amp setpoint values for a particular type and rate of feed and for a particular quality kiln product based on past experience will be employed by the operator to select an initial kiln amp setpoint.

Summing amplifier 82 is of the type well known in the art and provides an amp error signal $EAMP_n$ proportional to the difference between the kiln amp setpoint $AMP_{sp}$ and the present filtered value of kiln amps represented by signal $FAMP_n$, as expressed by the equation:

$$EAMP_n = AMP_{sp} - FAMP_n$$

Amp error signal $EAMP_n$ is positive if the present filtered value of kiln amps is less than the kiln amp setpoint and is negative if the present filtered value of kiln amps exceeds the kiln amp setpoint. The function of summing amplifier 82 may conveniently be performed in a digital computer.

If the process being performed in kiln 10 responded quickly to changes, for example a change in the rate of fuel combustion, the amp error signal $EAMP_n$ provided by summing amplifier 82 could be used directly to control the fuel rate setpoint. However, as previously described, the process in the kiln reacts very slowly to control action on fuel rate setpoint and normally the reaction to a control action may not be detected for a long period and then will normally continue for a long time thereafter. In responding to a control action, the process therefore has a long lag time plus a long time constant. The reaction time of a kiln, i.e. the time period between initiation of a control action and the resulting change in burning zone condition may be up to 30 minutes or more. Because of these characteristics, an analog controller cannot adequately perform the control function.

Effective control of kiln operation can be accomplished by employing a dynamic process model in accordance with the above-identified U.S. patent. The process model, identified by reference numeral 83 in FIG. 2, comprises a delay table in which control values are stored each time a control action is taken. If, for example, a control value is calculated every five minutes to initiate a control action, if required, this control value is stored in the process model and the control values previously stored are shifted through one storage position in the process model each time a new value is entered. Assuming an interval of five minutes between control value calculations, the fourth storage position down the table will contain the control value calculated twenty minutes earlier. The actual delay incorporated in the process model is the time period which elapses between initiation of a control action and the kiln response to this control action as reflected in change of burning zone condition, this delay being a function of the characteristics of a particular kiln. In a typical kiln, the delay between a control action, e.g. a fuel setpoint change, and the response thereto in the burning zone of the kiln may be of the order of 30–35 minutes or more. The delay table of the process model comprises a sufficient number of storage positions so that the delay range available in the delay table encompasses the delay characteristic of the kiln being controlled.

Process model 83 also includes arithmetic apparatus for providing feedback signal $FBAMP_n$. Feedback signal $FBAMP_n$ is applied to summing amplifier 84 along with amp error signal $EAMP_n$ from summing amplifier 82. Output signal $DELAMP_n$ of summing amplifier 84 constitutes a control value and represents the sum of feedback signal $FBAMP_n$ and amp error signal $EAMP_n$ as expressed by the equation:

$$DELAMP_n = EAMP_n + FBAMP_n$$

The function of summing amplifier 84 may conveniently be performed by a digital computer. Control value signal $DELAMP_n$ is applied to torque controller 85 which controls the fuel rate setpoint in accordance with the magnitude of $DELAMP_n$. Signal $DELAMP_n$ is also applied to process model 83 for storage in the delay table. The delay table of process model 83, assuming a period of five minutes between control value calculations, has stored therein the signals $DELAMP_n$, $DELAMP_{n-5}$, $DELAMP_{n-10}$, $DELAMP_{n-15}$ ... $DELAMP_{n-m}$ where $m$ is a number of minutes equal to or greater than the delay characteristic of the kiln being controlled.

The arithmetic apparatus forming a part of process model 83 periodically, e.g. every five minutes, calculates feedback signal $FBAMP_n$ in accordance with the following equation:

$$FBAMP_n = FBAMP_{n-1} + K_{fb}(DELAMP_{n-x} - FBAMP_{n-1})$$

where $FBAMP_n$ is the present feedback signal generated by the process model,
$FBAMP_{n-1}$ is the last feedback signal generated by the process model, $K_{fb}$ is the process model feedback constant, and
$DELAMP_{n-x}$ is a selected control value stored in the process model table ($x$=delay time of kiln in minutes)

Feedback constant $K_{fb}$ may, for example, have a value in the range 0.3 to 0.5. The signal $DELAMP_{n-x}$ may be any of the stored control values in the process model table corresponding to the delay between a control action and the reaction in the burning zone which is characteristic of the particular kiln. If the delay characteristic of the kiln is 35 minutes, stored control value $DELAMP_{n-35}$ is used by the process model to calculate feedback signal $FBAMP_n$. Feedback signal $FBAMP_n$ may be calculated by the arithmetic apparatus of process model 83 and control signal $DELAMP_n$ generated at any desired interval, for example every five minutes. After calculation of feedback signal $FBAMP_n$, the resulting value of control signal $DELAMP_n$ furnished by summing amplifier 84 is stored in the process model table and the previously stored values of signal DELAMP are shifted down the table in the process model.

Figure 3:
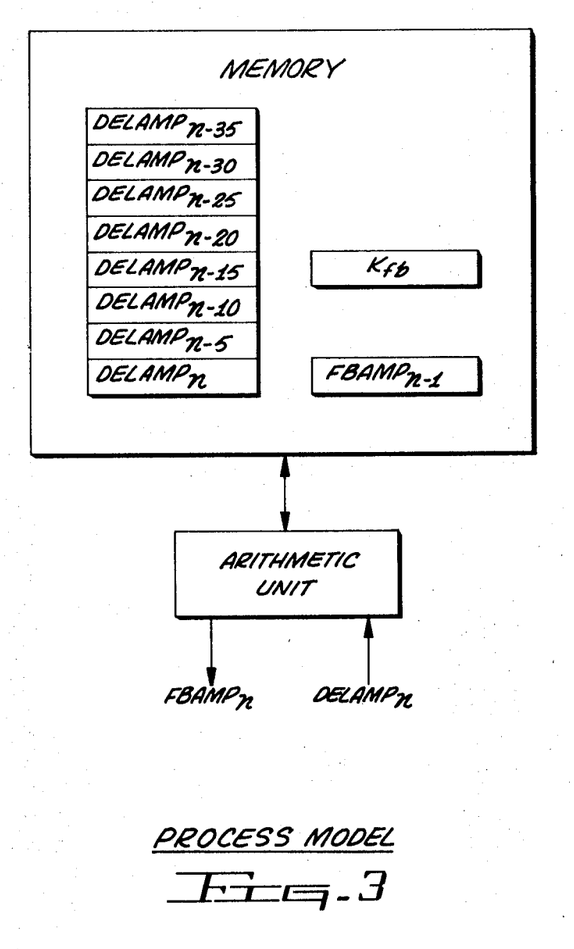
FIG. 3 is a block diagram illustrating the organization of the process model in the control system of FIG. 2.

The storage of successive control signals DELAMP and the calculation of feedback signal $FBAMP_n$ may conveniently be accomplished in a digital computer. The table of process model 83 may, for example, comprise a selected series of memory locations with the stored control values being shifted through the series of memory locations as the control values are entered into the table, as illustrated diagrammatically in FIG. 3. Feedback constant $K_{fb}$ and the previously calculated feedback signal $FBAMP_{n-1}$ may also be stored in the computer memory. The arithmetic unit of the digital computer serves to control the storage of successive control values $DELAMP_n$ in the table and utilizes the contents of the table and the stored values of $K_{fb}$ and $FBAMP_{n-1}$ to calculate feedback signal $FBAMP_n$.

Output signal $DELAMP_n$ of summing amplifier 84 is applied to torque controller 85 along with signal $FUEL_{base}$ from filter 86 representing the filtered rate of fuel flow to mixing chamber 27 and, thus, the rate of heat input to kiln 10 at the time control of the kiln by control system 51 is commenced. Thereafter $FUEL_{base}$ remains constant. Filter 86 receives on line 58 signal $FUEL_{scan}$ representing the output of fuel rate sensor 59 and filters and smooths signal $FUEL_{scan}$ in accordance with the following equation:

$$FFUEL_n = FFUEL_{n-1} + K_{fuel}(FUEL_{scan} - FFUEL_{n-1})$$

where:

$FFUEL_n$ is the new filtered value,
$FFUEL_{n-1}$ is the last filtered value,
$K_{fuel}$ is the filter constant, and
$FUEL_{scan}$ is the present output of sensor 59.

At the time automatic control of the kiln by control system 51 is initiated, filtering of $FUEL_{scan}$ in filter 86 is terminated and the value of $FFUEL_n$ at that time becomes $FUEL_{base}$ which thereafter remains constant. The function of filter 86 may conveniently be performed in a digital computer.

Torque controller 85, in response to signals $DELAMP_n$ and $FUEL_{base}$, generates signal $FUEL_{sp}$ representing the calculated fuel setpoint required to maintain or reach a stable operating condition in the kiln. Torque controller 85 calculates signal $FUEL_{sp}$ in accordance with the following equation:

$$FUEL_{sp} = FUEL_{base} + K_{fuel} DELAMP_n$$

where:

$FUEL_{sp}$ is the calculated fuel rate setpoint,
$FUEL_{base}$ is the base fuel value represented by output signal $FFUEL_n$ of filter 86 at the time the kiln is placed under control of control system 51 and thereafter remains constant at this base value, and
$K_{fuel}$ is the fuel/kiln amp proportionality constant, Proportionality constant $K_{fuel}$ is a function of the characteristics of the fuel and kiln being controlled. Torque controller 85 thus response to the output of summing amplifier 84 represented by signal $DELAMP_n$ and to the value of the base fuel rate represented by the signal $FUEL_{base}$ to provide signal $FUEL_{sp}$ representing the desired fuel setpoint to maintain stable operation of the kiln or to regain stable operation after a disturbance. Fuel setpoint signal $FUEL_{sp}$ is applied to controller 68 on line 65, as shown in FIG. 1. The function of torque controller 85 may be conveniently be performed in a digital computer.

Torque controller 85 is so named since changing the rate of flow of fuel to mixing chamber 27 changes the heat input to the kiln, eventually effecting the torque required from kiln drive motor 20 to rotate the kiln. For example, a decrease in the value of signal $FAMP_n$, indicating a shortening of the burning zone, results in an output signal from torque controller 85 increasing the fuel setpoint to cause the temperature in the kiln to increase with a resulting lengthening of the burning zone which will be reflected in an increased torque requirement and in an increase in the value of signal $FAMP_n$. Conversely, an increase in the value of signal $FAMP_n$ indicate a lengthening of a burning zone and the response of torque controller 85, acting under the influence of process model 83, is to decrease the fuel setpoint, reducing the heat input to the kiln which will eventually be reflected in the shortening of the burning zone and the reduction of the torque required to rotate the kiln, decreasing the value of signal $FAMP_n$.

This control arrangement thus tends to maintain a constant desired condition in the burning zone of the kiln, detecting changes in the condition of the burning zone by sesing drive motor torque and responding to such burning zone condition changes by varying the fuel rate setpoint in a direction which tends to return the burning zone to the desired condition. The process model serves to prevent cycling of the kiln by introducing into the control arrangement the expected future response to each control action taken. Thus, in response to a change in torque required to drive the kiln, indicating a change in the condition of the burning zone, a control action is taken in the form of an incremental change in fuel rate to compensate for the burning zone disturbance. After an interval of time determined by the kiln characteristics, the effect of the incremental change in fuel rate is realized as a corrective change in the burning zone condition which again affects the torque required to rotate the kiln. The process model prevents the change in required kiln rotational torque due to the effects of a control action from again affecting the fuel rate setpoint, thus preventing cycling of the kiln. The process model prevents kiln cycling by remembering changes in kiln torque to be expected due to previous control actions and by introducing these expected changes in kiln drive torque into the control loop, so that only kiln drive torque changes due to kiln disturbances not directly caused by previous control actions serve as a basis for further control action.

Fuel setpoint signal $FUEL_{sp}$ generated by torque controller 85 is transmitted to controller 68 on line 65 through logic switch 87, as illustrated in FIG. 2. Logic switch 87 normally connects the output of torque controller 85 to cotroller 68 but may serve to interrupt the controlling action of torque controller 85 in response to certain conditions in the kiln, as described hereafter in the specification.

The torque control loop comprising filters 80 and 86, check logic 81, summing amplifiers 82 and 84, process model 83 and torque controller 85 is capable of maintaining burning zone conditions within a desired range by adjustment of fuel rate setpoint. The torque control loop functions satisfactorily for variations in kiln torque within a predetermined range of values centered on the setpoint value. Heat imbalances reflected in torque variations which are caused by disturbances such as changes in secondary air temperature, changes in heat loss rate from the kiln due to change in ambient temperature, changes in coating thickness, changes in feed water content, changes in feed composition, etc. occur slowly and usually continuously, requiring almost constant correction of burning zone conditions which are well within the effective range of control of the torque control loop. The torque control loop will normally provide adequate control of the kiln burning zone for variations in kiln torque over a range of plus or minus ten to twenty percent of the setpoint value. However, depending upon kiln characteristics, the torque control loop may be ale to exercise effective control over the kiln within a range of only plus or minus five percent of the setpoint value.

If the kiln burning zone conditions, are represented by kiln torque, deviate outside the range of effective control of the torque control loop, a normal control action exercised by the torque control loop will probably not be sufficient to correct the disturbance. The most critical situation encountered in rotary cement kiln operation arises when kiln torque decreases below a certain value, indicating that the burning zone is substantially shorter than its normal length and that the kiln is going cold. As a result, the amount of dense clinker material in the burning zone may not be sufficient to resist the force of the feed dammed up behind the burning zone. Consequently, the feed may push forward to the discharge end of the kiln without completion of the clinkering reaction in the burning zone, resulting in a poor quality product. This undesirable situation may also be indicated and sometimes anticipated by observing the rate of change of kiln drive motor torque. Thus, if the kiln torque decreases at a predetermined rate, a corresponding rate of decrease in burning zone length is indicated and the critical condition may be predicted. Under these conditions, adjustment of fuel rate setpoint by the torque control loop with resulting increase in the rate of heat input to the kiln may not be adequate to correct this critical situation. In accordance with the invention, forcing apparatus is provided to correct this critical condition and to maintain effective control of the kiln until the kiln burning zone conditions return to a point within the range of effective control of the torque control loop.

Referring to FIG. 2, the forcing apparatus of the invention comprises rate logic 105, forcing logic 106, check and control logic 107 and summing amplifier 110. Amp error signal $EAMP_n$ provided at the output of summing amplifier 82 is applied to the forcing apparatus of the invention, as illustrated in FIG. 2, as well as the amplifier 84. Rate logic 105 and forcing logic 106 of the forcing apparatus of the invention each receive the output signals of summing amplifier 82. Rate logic 105 periodically calculates output signal $DERAMP_n$ representing the rate of change of drive motor torque. In the illustrated embodiment of the invention, the control period or time period between calculations of signal $DERAMP_n$ by rate logic 105 is selected to be the same as that employed in process model 83, viz. five minutes. However, any suitable time period may be employed. The function of rate logic 105 in determining torque rate of change is described in the equation:

$$DERAMP_n = EAMP_n - EAMP_{n-x}$$

where $DERAMP_n$ represents the rate of change of drive motor torque over the control period, for example, five minutes, $EAMP_n$ is the present output of summing amplifier 82 at the end of the control period, and $EAMP_{n-x}$ is the output of summing amplifier 82 which corresponds in time to the selected $DELAMP_{n-x}$ used to compute $FBAMP_n$.

The functions of rate logic 105 may conveniently be performed in a digital computer with the values $EAMP_n$ and $EAMP_{n-x}$ being stored in and shifted through the computer memory and the subtraction operation being performed in the computer arithmetic unit. Output signal $DERAMP_n$ of rate logic 105 is applied to forcing logic 106.

Forcing logic 106 receives output signal $EAMP_n$ of summing amplifier 82 and output signal $DERAMP_n$ of rate logic 105. Forcing logic 106 generates forcing functions signal FF which is a function of amp error signal $EAMP_n$ and of rate-of-change value $DERAMP_n$. The generation of forcing function signal FF by forcing logic 106 is represented by the equation:

$$FF = EAMP_n + K_3 \, DERAMP_n$$

where

FF is the forcing function value, $EAMP_n$ is the current amp error signal generated by summing amplifier 82, $DERAMP_n$ is the output signal of rate logic 105, and $K_3$ is a constant The function of forcing logic 106 may conveniently be performed in a digital computer with values $EAMP_n$, $DERAMP_n$ and constant $K_3$ being stored in a computer memory and the calculation being performed in the computer arithmetic unit. The value chosen for constant $K_3$ is determined by the desired relative effect of torque rate of change on the forcing function value. A typical value of constant $K_3$ is 5.0. Output signal FF of forcing logic 106 is applied to check and control logic 107.

Check and control logic 107 performs two functions. The first function of logic 107 is that of a comparator, checking the magnitude of forcing function value FF against a predetermined criterion having a selected value. This predetermined criterion is termed forcing reference value CONFF. If forcing function value FF is less than forcing reference value CONFF (FF < CONFF), no output signal is generated by check and control logic 107 and forcing control is not imposed on the kiln to vary the kiln speed. However, if forcing function value FF equals or exceeds forcing reference value CONFF (FF ≥ CONFF), check and control logic 107, as its second function, then generates kiln speed control signal $DELSPD_n$ in accordance with the following equation:

$$DELSPD_n = K_4 FF$$

where $DELSPD_n$ is the kiln speed control value.

FF is the forcing function value generated by forcing logic 106, and $K_4$ is a constant The value of constant $K_4$ is selected on the basis of the relative kiln speed change desired per unit value of forcing function FF. The functions of check and control logic 107 may conveniently be performed in a digital computer memory with values FF, CONFF and $K_4$ being stored in the computer memory and the comparison and arithmetic operations being performed in the computer arithmetic unit.

Speed control value $DELSPD_n$, if provided by check and control logic 107, is applied to summing amplifier 110. Kiln speed setpoint signal $KSPD_{sp}$ is also applied to summing amplifier 110. The kiln speed setpoint represented by signal $KSPD_{sp}$ is controlled by the operator by means of a potentiometer or a value stored in a digital computer and will normally be a value determined primarily by consideration of kiln characteristics, e.g. slope, length, feed rate, drive motor rating, etc. The kiln speed, once determined from the characteristics of the kiln, is normally maintained constant unless adjustment of kiln speed is necessary to correct a serious disturbance in the kiln which cannot be corrected by adjustment of other kiln variables such as fuel rate and exit gas rate.

Summing amplifier 110 is of a type well known in the art and provides a kiln speed controller setpoint signal $KSPD_n$ representing the difference between the kiln speed setpoint signal $KSPD_{sp}$ and kiln speed control signal $DELSPD_n$ from check and control logic 107, as expressed by the equation:

$$KSPD_n = KSPD_{sp} - DELSPD_n$$

The function of summing amplifier 110 may conveniently be performed in a digital computer. Output signal $KSPD_n$ of summing amplifier 110 on line 100 is applied to controller 101, as shown in FIG. 1. Controller 101 controls the rotational speed of kiln drive motor 20 and therefore the kiln rotational speed in accordance with the value of kiln speed controller setpoint signal $KSPD_n$.

The forcing method and apparatus of the invention permits adjustment of kiln rotational speed in a predictable and exact manner so that control of kiln operation may be maintained even though a disturbance having a magnitude sufficient to move the kiln operating point outside the normal range of effective control of the torque control loop has occurred. This results because kiln speed changes effect a process change more rapidly than fuel changes. This forcing action in altering kiln speed in response to unusual kiln conditions is over and above the normal control action of the torque control loop. Normally, a disturbance requiring forcing action is of a temporary nature and the forcing action can be removed when the disturbance has passed and the kiln has been returned to an operating point within the effective range of control of the torque control loop, at which time the kiln rotational speed is returned to normal. Although the use of a forcing action has been described only when the torque decreases rapidly, the concept is equally applicable to situations which may require the kiln speed to be increased.

In the kiln arrangement of FIG. 1 employing a constant field, DC kiln drive motor, variations in kiln rotational speed under control of the forcing apparatus do not affect the validity of the torque information provided to the torque control loop from the armature current sensor since, in a DC motor, the proportionality of torque to armature current is independent of speed so long as field current remains constant. However, if another type of DC or AC kiln drive motor is employed, the torque information provided to the torque control loop must be compensated as motor speed changes occur.

As illustrated in FIG. 2, a second control loop is provided in the control system comprising filter 88, check logic 89, summing amplifier 90, gas temperature controller 91 and logic switch 92. This control loop serves to maintain a relatively constant gas temperature near feed end 14 of the kiln to provide a relatively constant source of heat for the feed entering the kiln and a relatively constant temperature profile from the discharge end to the feed end of the kiln. The gas temperature at the feed end of the kiln is thereby decoupled from control actions which vary the rate of fuel flow and therefore the rate of heat input into the kiln due to control actions initiated in the torque control loop, previously described. Thus, as the fuel rate is increased or decreased to adjust burning zone conditions as reflected in required kiln drive torque, the temperature control loop adjusts the exit gas flow rate to maintain sufficient heat availability in the feed preparation section of the kiln comprising the drying and/or pre-heating zones.

Further, if heat requirements change due to changes in the characteristics of the raw materials entering the feed end of the kiln or due to changes in the feed rate, exit gas flow rate changes may become necessary. For example, if the raw materials require a greater quantity of heat, decreasing gas temperature at the kiln feed end, an increase in exit gas flow is required to carry more heat to the feed end of the kiln, thus maintaining the desired temperature profile in the kiln. If such action is not taken, the resulting decrease in gas temperature at the kiln feed end would eventually affect burning zone conditions and appear as a disturbance which would require more drastic corrective action to be taken in the torque loop previously described. The temperature control loop thus tends to compensate for disturbances and for the effects of control actions taken in the torque control loop to reduce the effect of these disturbances and control actions.

Filter 88 receives on line 54 a signal representing gas temperature at exit end 14 of the kiln, as measured by device 53. The gas temperature information represented by the signal is filtered in filter 88 in accordance with the following equation:

$$FTIG_n = FTIG_{n-1} + K_{tig}(TIG_{scan} - FTIG_{n-1})$$

where $FTIG_n$ is the present filtered value,
$FTIG_{n-1}$ is the previous filtered value,
$TIG_{scan}$ is the present measured value, and
$K_{tig}$ is the filter constant A typical value for constant $K_{tig}$ is 0.2 when $FTIG_n$ is calculated once every minute. Output signal $FTIG_n$ of filter 88 is applied to check logic 89 where signal $FTIG_n$ is compared with the previous output signal $FTIG_{n-1}$ of filter 88. If the two signals differ by more than a given amount, it is assumed that the thermocouple has failed and signal $FTIG_n$ is not used. The function of filter 88 and check logic 89 may be conveniently performed in a digital computer, with the signals $FTIG_n$, $FTIG_{n-1}$ and $TIG_{scan}$ and the constant $K_{tig}$ being stored in the computer memory.

Filtered gas temperature signal $FTIG_n$ is applied to summing amplifier 90 along with signal $TIG_{sp}$ representing the gas temperature setpoint as determined by the operator. Gas temperature error signal $ETIG_n$ produced by summing amplifier 90 is a function of signals $FTIG_n$ and $TIG_{sp}$, as expressed in the following equation:

$$ETIG_n = TIG_{sp} - FTIG_n$$

and is applied to gas temperature controller 91. The function of summing amplifier 90 may conveniently be performed in a digital computer.

Gas temperature controller 91 determines a desired exit gas flow rate in the kiln and includes both proportional and integral modes. The function of gas temperature controller 91 is represented by the equation for output signal $EXIT_n$ of controller 91, as follows:

$$EXIT_n = EXIT_{n-1} + K_1 ETIG_n + K_2 ETIG_{n-1}$$

where $EXIT_n$ is the desired exit gas flow rate,
$EXIT_{n-1}$ is the previous exit gas flow rate,
$ETIG_n$ is the present temperature error signal,
$ETIG_{n-1}$ is the previous temperature error signal, and
$K_1$ and $K_2$ are controller constants Typical values of constants $K_1$ and $K_2$ are 0.11 and $-0.10$ respectively and $EXIT_n$ may be calculated, for example, every five minutes. Output signal $EXIT_n$ of gas temperature controller 91 is applied to line 66 for application to controller 69 through logic switch 92. In the illustrated embodiment, signal $EXIT_n$ is employed to control the speed of fan 31 but may, as an alternative, serve to control the position of damper 38. Logic switch 92 normally connects temperature controller 91 to controller 69, as illustrated, but may also serve to interrupt the connection, as subsequently described in the specification.

The function of gas temperature controller 91 may be conveniently performed in a digital computer with signals $EXIT_n$, $EXIT_{n-1}$, $ETIG_n$ and $ETIG_{n-1}$ and constants $K_1$ and $K_2$ being stored in the computer memory.

A major safety consideration in the operation of a cement kiln is the oxygen content of the exit gases. The oxygen content must be above a minimum safe level, usually 0.5%, to be assured that no combustibles, or carbon monoxide, appear in the exit gases which might cause an explosion in the dust collection system. The oxygen content of the exit gases depends upon the exit gas rate and the fuel rate. If the oxygen content of the exit gases falls below the minimum safe level, the exit gas rate determined in the gas temperature control loop, and possibly the fuel rate determined in the torque control loop, must be altered to maintain safe kiln operation. For example, if the fuel rate required by the torque control loop will result in an oxygen content below the minimum safe level at the exit gas rate determined by the gas temperature control loop, the exit gas rate determined by the gas temperature control loop must be overruled and a safe rate set. If the exit gas rate is already at a maximum, as limited by the position of damper 38 or by the speed of fan 31, and if the oxygen content is still below the minimum safe level, the fuel rate determined by the torque control loop must be overruled and a new fuel rate determined to insure safe operation.

Oxygen override logic 95 of the control system, as shown in FIG. 2, monitors the oxygen content of the exit gas and determines what the new oxygen content will be after the contemplated control actions are taken. If the predicted oxygen content is less than the prescribed minimum safe level, logic 95 takes overriding action. The priority of the overriding logic is such that the exit gas rate calculated by gas temperature controller 91 is sacrificed first to permit the desired fuel rate determined by torque controller 85, override logic 95 calculating a new exit gas rate setpoint which will result in a predicted oxygen content at the minimum safe level for the desired fuel rate. However, if the exit gas rate cannot be adjusted sufficiently to provide the required minimum oxygen content, the fuel rate is also adjusted by override logic 95 to produce the safe minimum oxygen content at the maximum exit gas rate. Oxygen override logic 95 thus prevents dangerous conditions from occurring by preventing the selection of fuel and exit gas flow rates which reduce the oxygen content of the exit gas below a minimum safe level.

Oxygen override logic 95 receives the outputs of torque controller 85 and gas temperature controller 91 in addition to the signal on line 56 from analyzer 55 representing exit gas oxygen content and the signal on line 52 from sensor 50 representing feed rate of raw materials into feed end 14 of the kiln. The output signals of oxygen override logic 95 are applied to logic switches 86 and 92 respectively to override, as required, the fuel rate setpoint and exit gas rate as determined by torque controller 85 and gas temperature controller 91 respectively, when such action is necessary to maintain a minimum safe level of oxygen in the exit gases. High oxygen content in the exit gas can also be monitored by the oxygen override logic 95 to maintain a desired range of oxygen levels. Oxygen override logic 95 has the capability of calculating predicted oxygen content and employing this as a substitute for measured oxygen content when analyzer 55 is unavailable due to, for example, operating problems.

Oxygen override logic 95 calculates the present exit gas rate as follows:

$$EN = \frac{[29.354 \; FUEL_{sp-1} + 15.91 \; FEED_n]}{1 - \frac{O2_n}{21}}$$

where

EN is the present exit gas rate in moles per hour,
$FUEL_{sp-1}$ is the old fuel rate setpoint in K s.c.f. (thousands of standard cubic feet) per hour presently being used,
$FEED_n$ is the present feed rate in tons per hour, as measured by feed rate detector 50 and as represented by the signal on line 52,
$O2_n$ is the present oxygen content of the exit gas as measured by analyzer 55 and represented by the signal on line 56, and
29.354 and 15.91 are specific constants for a given fuel and feed composition.

The predicted oxygen content of the exit gas based on the new fuel rate $FUEL_{sp}$ determined by the torque control loop can then be calculated as follows:

$$O2_{n+1} = 21 \left[ 1 - \frac{29.354 \; FUEL_{sp} + 15.91 \; FEED_n}{EXIT_n} \right]$$

where $FUEL_{sp}$ is the new required fuel rate determined by torque controller 85 in the torque control loop,
$FEED_n$ is the present feed rate of raw materials into the kiln,
$EXIT_n$ is the new required exit gas rate determined by temperature controller 91 in the gas temperature control loop, and
$O2_{n+1}$ is the predicted oxygen content.

If the predicted oxygen content $O2_{n+1}$ is less than the safe minimum, a new overriding exit gas rate $OEXIT_n$ is calculated as follows:

$$OEXIT_n = \frac{29.354 \; FUEL_{sp} + 15.91 \; FEED_n}{1 - \frac{O2_{min}}{21}}$$

where $O2_{min}$ is the safe minimum oxygen content of the exit gas.

If the recalculated exit gas rate $OEXIT_n$ is greater than the capacity of fan 31, then a new overriding fuel rate $OFUEL_{sp}$ which will be less than $FUEL_{sp}$ determined by torque controller 85 must be calculated using maximum capacity of fan 31 or $EXIT_{max}$ as follows:

$$OFUEL_{sp} = \frac{\left[ EXIT_{max} \left( 1 - \frac{O2_{min}}{21} \right) - 15.91 \; FEED_n \right]}{29.354}$$

This recalculated fuel rate $OFUEL_{sp}$ will result in the minimum safe exit gas oxygen content when the exit gas rate is at the maximum. A signal representing exit gas rate $OEXIT_n$, as calculated by oxygen override logic 95, or a signal representing the maximum exit gas rate $EXIT_{max}$, if required, is applied to logic switch 92 and takes precedence over the exit gas rate $EXIT_n$ determined by gas temperature controller 91. Similarly, if a new fuel setpoint $OFUEL_{sp}$ is calculated by oxygen override logic 95, a signal representing this new fuel setpoint is applied to logic switch 87 and takes precedence over the fuel rate setpoint $FUEL_{sp}$ determined by torque controller 85. The functions of oxygen override logic 95 may be conveniently performed in a digital computer, with the computer memory being employed to store the signals required for the computations.

Figure 4A:
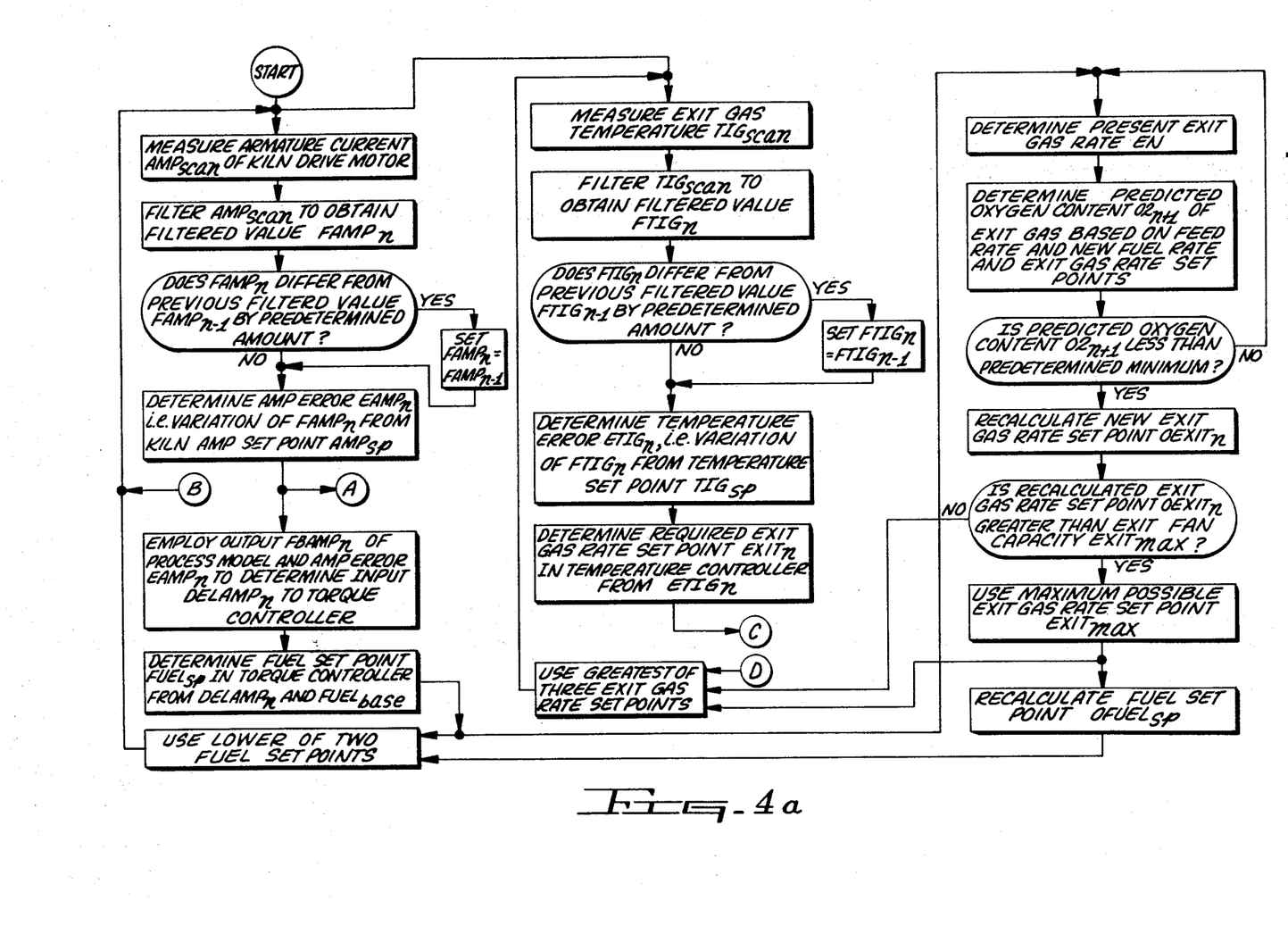
FIGS. 4a, 4b and 4c are flow diagrams illustrating the operation of the control system of FIG. 2.
Figure 4B:
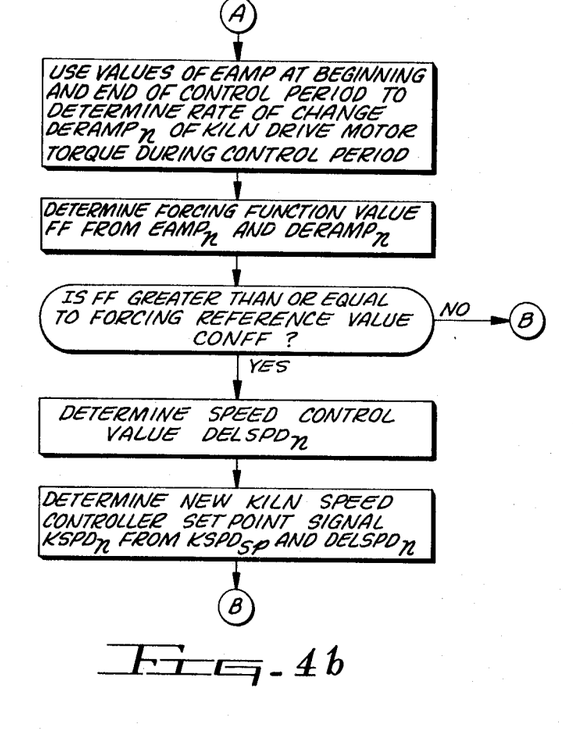
Figure 4C:
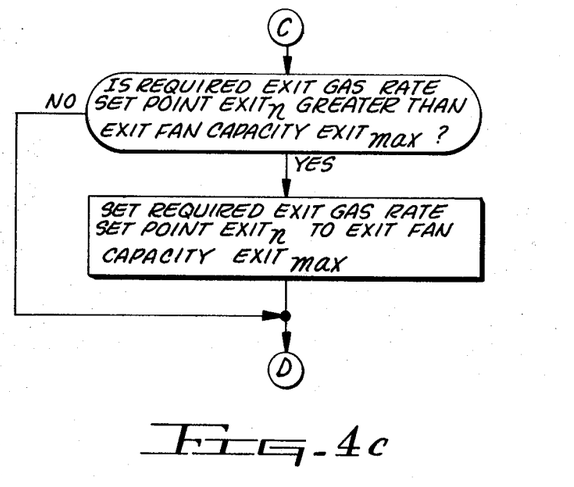

FIGS. 4a, 4b and 4c illustrate a flow chart of the operation of the control system of FIG. 2. Referring to FIG. 4a, signal $AMP_{scan}$ representing the armature current of kiln drive motor 20 and therefore the torque developed by motor 20 is made continuously available to the torque control loop. The signal is filtered periodically, e.g. every five seconds, to obtain a filtered value $FAMP_n$. The signal $FAMP_n$ is compared to the previous filtered value $FAMP_{n-1}$ and if the two values differ by more than a predetermined amount, the previous value $FAMP_{n-1}$ is saved and used in lieu of $FAMP_n$. Otherwise, the filtered value $FAMP_n$ is compared to the kiln amp setpoint $AMP_{sp}$ set by the operator and an error signal $EAMP_n$ is generated representing the difference between $FAMP_n$ and $AMP_{sp}$.

Error signal $EAMP_n$ at the end of a control period and the amp error value $EAMP_{n-x}$ at the beginning of the control period are employed to determine the rate of change $DERAMP_n$ of kiln drive motor torque during the control period. Forcing function value FF is next determined from amp error signal value $EAMP_n$ and torque rate-of-change value $DERAMP_n$. Forcing function value FF is then compared to forcing reference value CONFF which defines the limits of normal control of the torque control loop. If forcing function value FF is equal to or exceeds forcing reference value CONFF, speed control value $DELSPD_n$ is calculated. A new kiln speed controller setpoint signal $KSPD_n$ is then determined based on the normal kiln speed setpoint value $KSPD_{sp}$ and the kiln speed control value $DELSPD_n$.

Feedback signal $FBAMP_n$ provided by the process model and amp error signal $EAMP_n$ are employed to generate signal $DELAMP_n$. The torque controller of the torque control loop utilizes signal $DELAMP_n$ and signal $FUEL_{base}$ representing base fuel rate to calculate a new fuel set point $FUEL_{sp}$.

Concurrent with the above-described operations in the torque control loop, the following operations occur in the temperature control loop, as illustrated in FIG. 4A. Signal $TIG_{scan}$ on line 54 representing the temperature of the exit gases in the kiln is made available to the control system and the signal is filtered periodically, for example every three minutes, to obtain filtered value $FTIG_n$. Signal $FTIG_n$ is compared with the previous filtered value represented by signal $FTIG_{n-1}$ and if the two values differ by a predetermined amount, an alarm typeout occurs and previous value $FTIG_{n-1}$ is saved and used in lieu of $FTIG_n$. Otherwise, filtered value $FTIG_n$ is compared with the gas temperature setpoint $TIG_{sp}$ provided by the operator and any difference between the filtered temperature value and the temperature setpoint is represented by gas temperature error signal $ETIG_n$. The temperature controller in the temperature control loop utilizes the error signal $ETIG_n$ to calculate the new exit gas rate setpoint $EXIT_n$. If the exit gas rate setpoint $EXIT_n$ is less than or equal to maximum fan capacity represented by a signal $EXIT_{max}$, then it is used directly in a comparison with other calculated exit gas rate setpoints described herewith. Should the signal $EXIT_n$ represent a setpoint having a greater capacity than the fan is capable of providing, the signal $EXIT_n$ is set equal to the signal $EXIT_{max}$ and used in the comparison.

Prior to utilizing the newly calculated feed rate and exit gas rate setpoints $FUEL_{sp}$ and $EXIT_n$ respectively, the oxygen override logic determines the present exit gas rate EN and calculates the predicted oxygen content $O2_{n+1}$ of the exit gas based on the new fuel rate and exit gas rate setpoints and on the rate of feed of raw materials into the kiln. If the predicted oxygen content is at least equal to a predetermined safe minimum oxygen content, the new fuel rate and exit gas rate setpoints determined in the torque control and temperature control loops are employed to control the kiln operation. If, however, the predicted oxygen content is less than the predetermined safe minimum, the new exit gas rate setpoint $OEXIT_n$ is calculated based on the required minimum safe oxygen content. If the recalculated exit gas rate setpoint $OEXIT_n$ is not greater than the capacity of the exit fan $EXIT_{max}$, the recalculated exit gas rate is used to control kiln operation in conjunction with the new fuel rate setpoint determined in the torque control loop. If the recalculated gas exit rate setpoint $OEXIT_n$ requires an exit gas rate greater than the capacity $EXIT_{max}$ of the exit fan, the maximum exit gas rate setpoint $EXIT_{max}$ is employed and a new fuel rate setpoint $OFUEL_{sp}$ is calculated by the oxygen overide logic. The maximum exit gas rate setpoint $EXIT_{max}$ and the new fuel rate setpoint $OFUEL_{sp}$ as determined by the oxygen override logic are then employed to control kiln operation.

Figure 5:
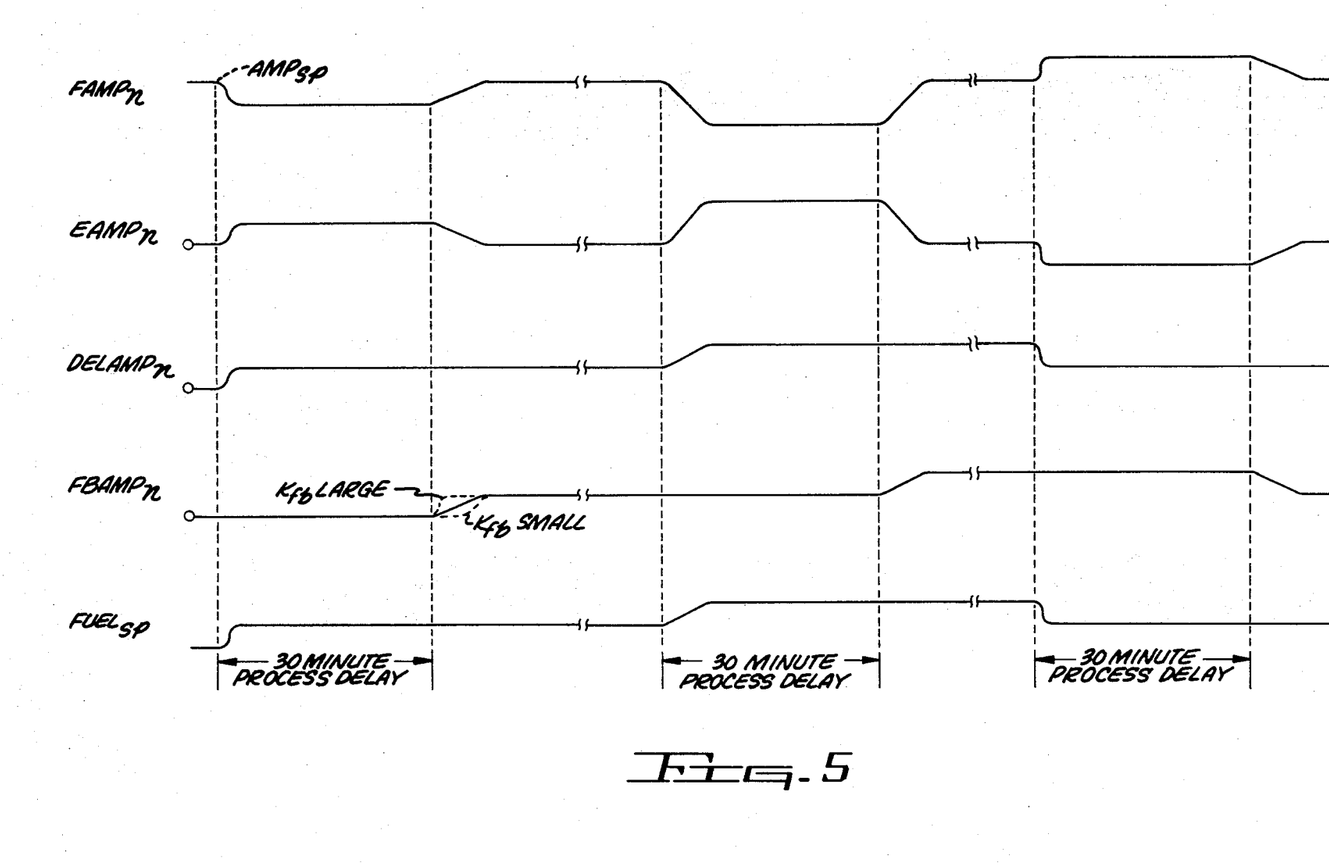
FIG. 5 is a signal diagram illustrating the normal operation of the control system of FIG. 2 in controlling rotary cement kiln operation.

FIG. 5 is a signal diagram graphically illustrating the operation of the torque control loop in the control system of FIG. 2 for disturbances within the normal control range. This illustration of how the control system is utilized is described in detail in the aforementioned U.S. Pat. Ser. No. 678,851.

Figure 6:
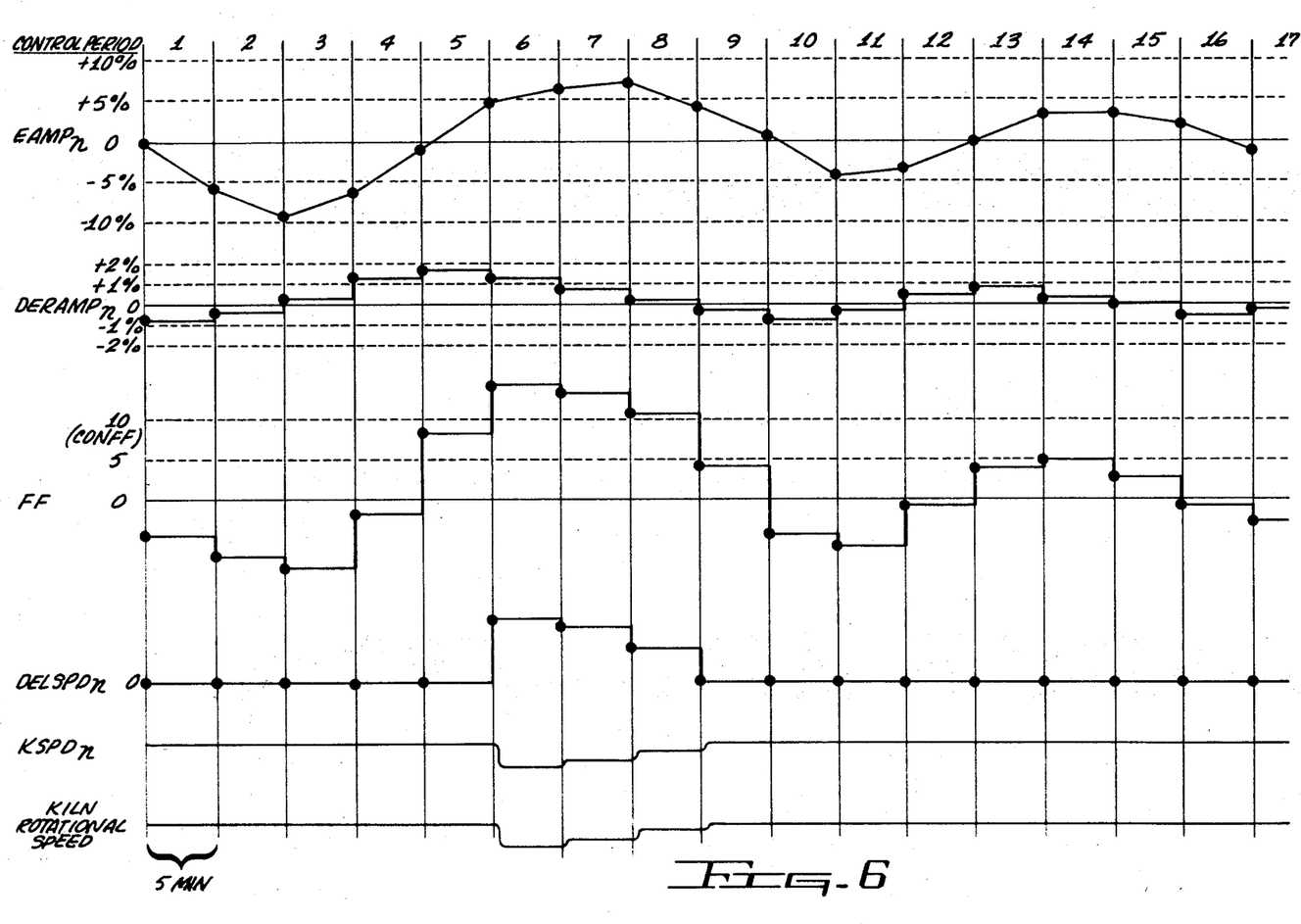
FIG. 6 is a signal diagram illustrating the operation of the forcing apparatus of the control system of FIG. 2.

FIG. 6 is a signal diagram illustrating the system operation for the control system of FIG. 2 when the forcing apparatus is added. Referring to FIG. 6, for purposes of illustration variations of amp error signal $EAMP_n$ are represented as percentage changes from the normal value of the kiln amp setpoint defined by signal $AMP_{sp}$. Thus, if the kiln amp setpoint is 500 amps, a ten percent variation of amp error signal $EAMP_n$ from zero in FIG. 6 represents a fifty amp deviation of signal $FAMP_n$ from the kiln amp setpoint. Variations in torque rate-of-change signal $DERAMP_n$ in FIG. 6 are represented as percentage changes from the normal value of the kiln amp setpoint per control period. In the example of FIG. 6, a control period of five minutes is assumed. For a kiln amp setpoint of 500 amps, a torque rate of change of two percent in the example of FIG. 6 would be equivalent to a change of ten amps during a control period of five minutes. In the example of FIG. 6, constant $K_3$ employed to determine forcing function value FF is assumed to be 5.0 and the value of constant $K_4$ employed to determine speed change value $DELSPD_n$ is assumed to be 1.0. Forcing reference value CONFF is assumed to be ten.

In the example of FIG. 6, the kiln is initially operating within the effective range of control of the torque control loop of the control system of FIG. 2 and the kiln rotational speed corresponds to the kiln speed setpoint $KSPD_{sp}$. Kiln speed controller setpoint signal $KSPD_{sp}$ is therefore equal to setpoint signal $KSPD_{sp}$ and kiln speed control value $DELSPD_n$ is zero. At the beginning of the first five-minute control period, amp error signal $EAMP_n$ is zero, as illustrated, and torque rate-of-change signal $DERAMP_n$ is approximately $-1\%$, indicating that the kiln torque is normal but rising. At the end of the first control period and at the beginning of the second control period, amp error signal $EAMP_n$ is $-6\%$ and rate-of-change signal $DERAMP_n$ is approximately $-0.4\%$, indicating that the kiln torque is high and still rising, but at a lower rate. At the beginning of control period three, amp error signal $EAMP_n$ is $-9\%$ while rate-of-change signal $DERAMP_n$ is approximately $+0.2\%$, indicating that the kiln torque is still high but is starting to decrease. As evident from the conditions at the beginning of control periods four and five, amp error signal $EAMP_n$ is becoming progressively less negative while rate-of-change signal $DERAMP_n$ is becoming progressively more positive, indicating that the kiln torque is still decreasing. Throughout control periods one through five, forcing function value FF remains below forcing reference value CONFF.

At the beginning of control period six, the value of amp error signal $EAMP_n$ is $+5\%$ while rate-of-change signal $DERAMP_n$ is approximately $+1.5\%$, indicating that kiln torque is low and decreasing. At this time, forcing function value FF is approximately fifteen and exceeds forcing reference value CONFF, indicating that the kiln operating point is outside the effective range of control of the torque control loop and that the critical condition of short burning zone is present or imminent. Speed control signal $DELSPD_n$ is generated and applied to summing amplifier 110. Kiln speed controller setpoint signal KSPD is reduced below the level of setpoint signal $KSPD_{sp}$ in proportion to the magnitude of speed control signal $DELSPD_n$, causing the rotational speed of the kiln to be reduced accordingly. Assuming a normal kiln rotational speed of sixty revolutions per hour and an FF signal value of +15 at the beginning of control period six, kiln speed control signal $DELSPD_n$ has a value of approximately +1, reducing kiln rotational speed to approximately forty-five revolutions per hour.

In response to the reduction in kiln rotational speed, heat transfer to each increment of feed in the kiln is increased per length of the kiln traversed by the beginning of control periods ten through seventeen indicate that kiln torque and torque rate-of-change continue to vary within the effective range of control of the torque control loop. The torque control loop will thus continue to maintain control over kiln operation until a subsequent disturbance occurs which causes the kiln operating point to deviate outside the effective range of control of the torque control loop, necessitating action by the forcing apparatus to cause the kiln operating point to again return within the effective range of control of the torque control loop.

Figure 7:
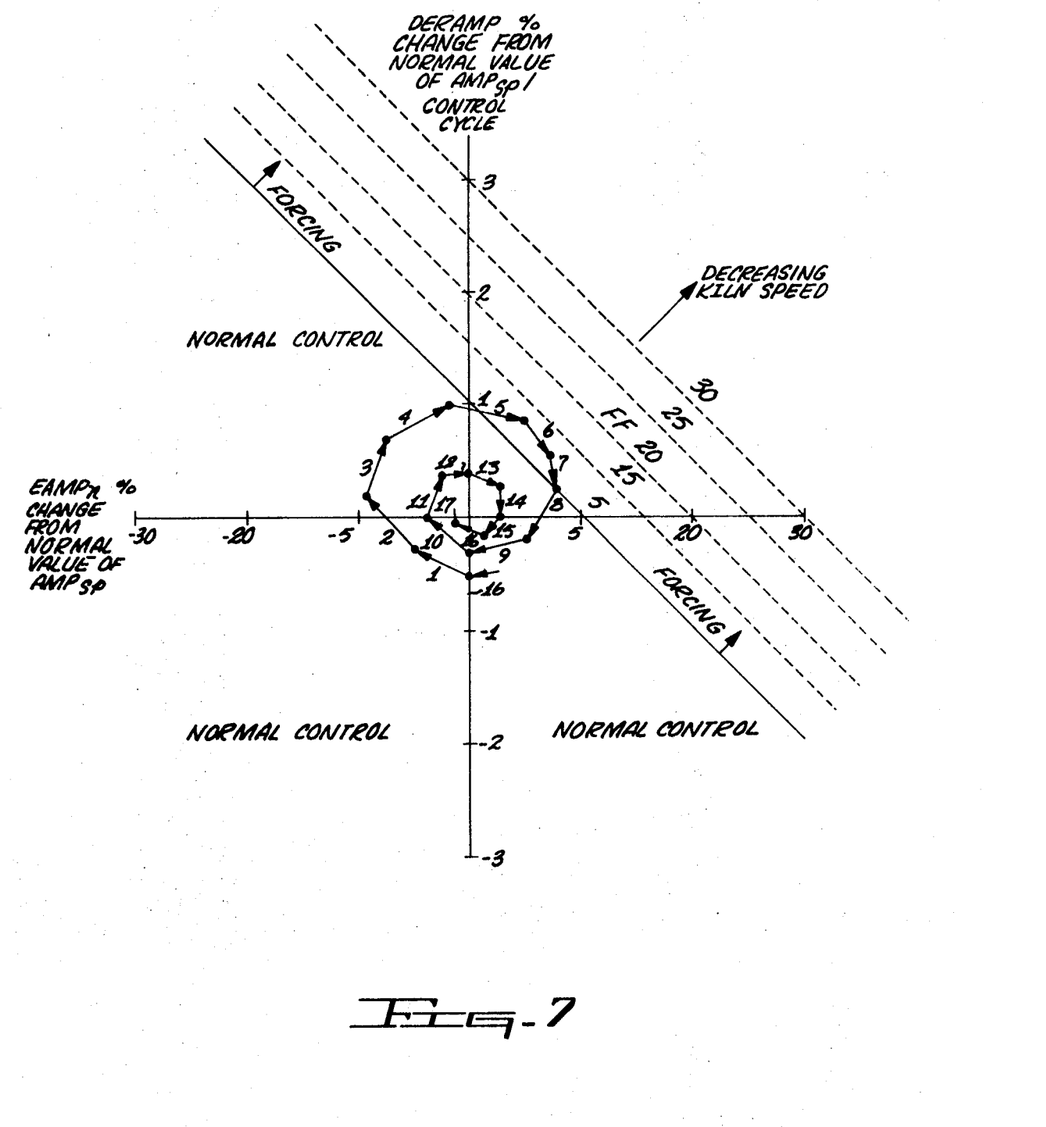
FIG. 7 is a diagram graphically illustrating the operation of a cement kiln under control of the system of FIG. 2.

FIG. 7 graphically illustrates the operation of the kiln for the signal variations illustrated in FIG. 6 and showing the relationship of forcing function control to normal control under direction of the torque control loop. The values of $EAMP_n$ and $DERAMP_n$ are again shown as percentages for purposes of illustration. The reference numerals identifying the successive control periods of FIG. 6 are also employed in FIG. 7 to show corresponding kiln operating points. Referring to FIG. 7, during the first five control periods, the kiln is operating normally under control of the fuel increment, causing the length of the burning zone to gradually change. At the beginning of sixth control period, the operating point of the kiln is outside the area of normal control and within the area of forcing control.

At the beginning of control periods seven and eight, the kiln torque is still low and dropping and the forcing function value FF is still greater than the forcing reference value CONFF, although decreasing. Speed control signal $DELSPD_n$ also decreases proportionally at the beginning of control periods seven and eight, as illustrated in FIG. 6. As speed control signal $DELSPD_n$ decreases, kiln speed controller setpoint signal $KSPD_n$ increases accordingly to increase the kiln rotational speed. At the beginning of control period nine, the kiln torque is still low but rate-of-change signal $DERAMP_n$ has become negative, indicating that the torque is rising and that the length of the burning zone is therefore increasing. Forcing function value FF drops below forcing reference value CONFF, speed control signal $DELSPD_n$ is reduced to zero, causing the kiln speed controller setpoint signal $KSPD_n$ to equal the kiln speed setpoint signal $KSPD_{sp}$ to return the kiln rotational speed to normal. The forcing apparatus therefore reduces the kiln speed during control period six, seven and eight to slow the forward motion of the feed in the kiln, permitting the burning zone length to increase to the point where normal control by the torque control loop is again permissible. The forcing apparatus thus prevents the feed from reaching the discharge end of the kiln without completion of the clinkering reaction. During control periods nine through seventeen, the torque control loop exercises normal control. Recovery of normal burning zone conditions to return the kiln operating point to within the effective range of control of the torque control loop will normally take from fifteen to thirty minutes or more.

In the description, the desirability of employing a digital computer to perform various functions has been indicated. With such an implementation, analog-to-digital and digital-to-analog converters would be employed as required.

Accordingly, there has been described herein a method and apparatus for kiln control embodying the instant invention. All the principles of the invention have now been made clear in the illustrated embodiment, and there will be immediately obvious to those skilled in the art many modifications in structure, steps, arrangement, proportions, elements, materials and components used in the practice of the invention. For example, if constant changes in kiln amp setpoint will be encountered, the control system of FIG. 2 may be altered so rate logic 105 is energized by $FAMP_n$ and $FAMP_{n-x}$. $FAMP_{n-x}$ representing the time period value of motor torque should be obtained from another set of storage locations in process model 83. The resulting signal $DERAMP_n$ would be calculated by $$DERAMP_n = FAMP_n - FAMP_{n-x}$$

The appended claims are therefore intended to cover the embrace any such modifications, within the limits only of the true spirit and scope of the invention.

What is claimed as new and desired to be secured by Letters Patent of the United States is:

1. In a rotary cement kiln control system including drive means for rotating the kiln at a constant speed, sensing means responsive to the torque developed by said drive means to rotate the kiln for providing a corresponding output, and control means directly and primarily responsive to a first range of variations in the output of said sensing means for varying the rate of heat input into the kiln so as to maintain relatively constant the torque developed by said drive means to rotate the kiln at the constant speed, the improvement of means in said control means responsive to variations outside said first range for altering the speed of said drive means to thereby alter the kiln speed.

2. A control system for a rotary cement kiln as recited in claim 1 additionally comprising means responsive to said torque sensing means for generating an output signal representing the rate of change of torque and means for combining the rate of change of torque and torque signals to control said kiln speed altering means.

3. In a rotary cement kiln control system including drive means for normally rotating the kiln at a constant speed, sensing means responsive to the torque developed by said drive means to rotate the kiln for providing a corresponding output and control means directly and primarily responsive to a first range of variations in the output of said sensing means for varying the rate of heat input into the kiln so as to maintain relatively constant the torque developed by said drive means to rotate the kiln at the constant speed, the improvement of means for controlling the drive means to alter the kiln speed comprising means responsive to the output of said sensing means for generating a signal which is variable in accordance with the rate of change of the torque signal, forcing function generating means responsive to the variations of said sensing means output and the rate of change of torque generating means for indicating adverse kiln conditions, said drive means being responsive to the presence of the adverse conditions to alter the kiln speed.

4. A control system for a rotary cement kiln as recited in claim 3 additionally comprising means for generating a kiln speed change signal which varies in accordance with torque decreases and negative rates of change of torque, said drive means being responsive to the speed change signal for decreasing kiln speed in response thereto, said kiln speed change signal generating means being responsive to said forcing function generating means.

5. A control system for a rotary cement kiln as recited in claim 3 wherein said control means is responsive to the first range of variations in the output of said sensing means not directly due to previous control actions initiated by said control means for varying the rate of heat input, said speed control means being immediately responsive to torque variations outside the first range to vary kiln speed.

6. In a rotory cement kiln system having drive means for normally rotating the kiln at a constant speed, feed means for supplying raw materials to the kiln and a high energy heat source for heating the materials in the kiln, a control system comprising: sensing means responsive to the torque developed by said drive means to rotate the kiln for providing a corresponding output, control means responsive to a first range of variations in the output of said sensing means from a setpoint for providing a control signal, said control means including means for storing control signals previously produced by said control means and responsive to a selected one of said control signals for generating a feedback signal representing an expected variation in the output of said sensing means due to a previous control signal produced by said control means, said control means including further means responsive to the feedback signal for preventing variations in the control signal produced by said control means in response to variation in the output of said sensing means due to previous control signals produced by said control means, means responsive to variations in the control signal produced by said control means for varying the rate of heat input to the kiln from said high energy heat source so as to maintain relatively constant the conditions within the kiln and the torque developed by said drive means to rotate the kiln, and means responsive to variations in the output of said sensing means outside the first range for immediately controlling said kiln drive means to alter the kiln speed.

7. A control system for a rotary cement kiln as recited in claim 6 wherein said drive control means comprises means for obtaining the derivative of the signal from said sensing means, means for combining the signals from said sensing means and said derivative means and means responsive to decreases in the signal from said sensing means and negative values of the signal from said derivative means for controlling said drive means to decrease kiln speed.

8. A method for controlling a rotary cement kiln including drive means for normally rotating the kiln at a constant speed and sensing means responsive to torque developed by said drive means to rotate the kiln for providing a corresponding output comprising the steps of controlling heat input to the kiln in response to a first range of variations of signals from the sensing means so as to maintain relatively constant the torque developed by the drive means to rotate the kiln at the constant speed and controlling the drive means to change the speed of the kiln for signals from said sensing means which are outside the first range of variations to thereby alter conditions in the kiln and return the primary control of the kiln to said first controlling step.

9. A method for controlling a rotary cement kiln as recited in claim 8 additionally comprising the steps of generating from the output signal of the sensing means a signal indicating the rate of change of torque and combining the rate of change of torque and torque signals, said controlling of said drive means being in response to the combined signals.

10. A method for controlling a rotary cement kiln including drive means for normally rotating the kiln at a constant speed and sensing means responsive to torque developed by the drive means to rotate the kiln for providing a corresponding output comprising the steps of directly and primarily controlling heat input to said kiln in response to a first range of variations in the signal from the sensing means so as to maintain relatively constant the torque developed by the drive means to rotate the kiln at the constant speed and for variations of the signal from the sensing means outside the first range of variations generating a signal which is variable in accordance with the rate of change of the signal from the sensing means and generating a forcing function in response to the rate of change of torque signal and the signal from the sensing means for indicating adverse kiln conditions and causing the drive means to alter the kiln speed in response to the signal from the forcing function generating means indicating adverse conditions.

11. A method for controlling a rotary cement control kiln as recited in claim 10 additionally comprising the steps of generating a kiln speed change signal variable in accordance with signals from the sensing means indicating torque decreases and negative signals from said rate of change of torque generating means for controlling the drive means to thereby decrease kiln speed.

12. A method for controlling a rotary cement kiln as recited in claim 10 wherein said control of heat input in response to the variations of signals in the first range from said sensing means is not directly due to previously initiated control actions, said control of said drive means being immediately responsive to torque variations outside the first range.

13. A method for controlling a rotary cement kiln having drive means for normally rotating the kiln at a constant speed, feed means for supplying raw materials to the kiln and a high energy heat source for heating the materials in the kiln comprising the steps of sensing the torque developed by the drive means to rotate the kiln, generating a torque signal in response thereto, responding to a first range of variations of torque signal from a set point and generating a control signal, storing previous control signals, generating a feedback signal in response to a selected one of previously stored control signals to represent an expected variation in the torque signal due to a previous control signal, in response to the feedback signal preventing variations in the control signal in response to variations of the sensing means due to previous control signals, varying the heat input to the kiln from the high energy heat source so as to make relatively constant the conditions within the kiln and the torque developed by the drive means to rotate the kiln in response to variations of the control signal, and controlling the kiln drive means to alter the kiln speed in immediate response to variations of the torque signal outside the first range of variations.

References Cited
UNITED STATES PATENTS

| 3,437,325 | 4/1969 | Putnam et al. | 263—32 |
| 3,469,828 | 9/1969 | Lane | 263—32 |

JOHN J. CAMBY, Primary Examiner

UNITED STATES PATENT OFFICE
CERTIFICATE OF CORRECTION

Patent No. 3,606,284          Dated September 20, 1971

Inventor(s) Myron R. Hurlbut and James W. Lane

It is certified that error appears in the above-identified patent and that said Letters Patent are hereby corrected as shown below:

Column 2, line 68, "maniplated" should be -- manipulated --. Column 5, line 6, after "of" (second occurrence), insert -- the --. Column 10, line 11, after "may", delete -- be --; line 64, "cotroller" should be -- controller --. Column 11, line 13, "ale" should be -- able --. Column 12, line 11, "tions" should be -- tion --. Column 19, line 40, after "CONFF", insert -- and --. Column 20, line 64, "rotory" should be -- rotary --. Column 21, line 45, (claim 9), after "torque" (second occurrence), insert -- change --.

Signed and sealed this 16th day of May 1972.

(SEAL)
Attest:

EDWARD M. FLETCHER, JR.
Attesting Officer

ROBERT GOTTSCHALK
Commissioner of Patents